UNITED STATES PATENT OFFICE.

ROBERT McKINNEY, OF DETROIT, MICHIGAN, ASSIGNOR OF TWO-THIRDS TO JOHN MINER AND MICHAEL KEENAN, OF SAME PLACE.

PROCESS OF MAKING FOOD COMPOUNDS.

SPECIFICATION forming part of Letters Patent No. 468,751, dated February 9, 1892.

Application filed May 22, 1891. Serial No. 393,786. (No specimens.)

*To all whom it may concern:*

Be it known that I, ROBERT McKINNEY, a citizen of the United States, residing at Detroit, in the county of Wayne and State of Michigan, have invented certain new and useful Improvements in Food Products and the Process of Producing Same; and I do declare the following to be a full, clear, and exact description of the invention, such as will enable others skilled in the art to which it appertains to make and use the same.

This invention relates to an improved food product from potato and other vegetables and the process of producing the same, which will be fully hereinafter set forth, and the essential features pointed out particularly in the claim.

The object of the invention is to produce a food product from vegetables of greatly-decreased weight and bulk that will remain sweet and wholesome for an indefinite time in any climate or temperature and in which all the nutritious properties of the vegetable are preserved and retained. This object is simply and perfectly accomplished in the following manner: The vegetable is first peeled, then sliced or grated, after which it is immersed in a preserving solution, the ingredients and proportions of which are about as follows: water, ninety-eight and seven-tenths per cent.; chloride of sodium, one per cent.; boracic acid, three-tenths per cent. When the vegetable has become thoroughly saturated with this preserving solution, it is removed therefrom and drained. Then it is passed through a bleachery, in which it is subjected to the fumes or gases produced by the combustion of sulphur, whereby it is rendered clear and white. It is then passed through an evaporator or drier that completely exhausts the water therefrom. In this desiccated state it is known as "vegetable chips," but differs from the ordinary product of this kind in several important particulars, especially that product known as "potato chips," which, as ordinarily made, are not treated to the preserving solution, as above described, but instead are cooked in oil. This destroys or neutralizes some of the component properties and when recooked gives them a taste foreign to potato, is an expensive way of preparing them, and at best potatoes so prepared will keep but a few months, when it sours and becomes unfit for an article of food. While said chips prepared by my improved process contain all the properties of potato, except water, in their normal condition and quantity, including nitrogenous matter, starch, sugar, fat, and salt, producing an article of food that is wholesome and highly nutritious, in which condition it will keep for a great length of time, and when placed in water will absorb the per cent. of water that has been exhausted therefrom and return to the condition of the raw potato, having the full taste and properties thereof.

To produce flour from this improved food product, the vegetable is preserved and desiccated in the manner above set forth, after which it is reduced to the condition of flour by any suitable process of grinding. Potato-flour as ordinarily made is composed, principally, if not entirely, of starch, all the other properties of potato being eliminated in the process of production, while flour produced from potato by my improved process contains all the properties of potato, except the per cent. of water which is exhausted, making a flour much richer in nutritive qualities and more generally adapted for culinary purposes.

Having thus fully set forth my invention, what I claim as new, and desire to secure by Letters Patent, is—

The process of producing a food product from vegetables, consisting of first saturating the sliced or grated vegetable in a solution of water, chloride of sodium, and boracic acid in the proportions about as specified, then bleaching said product, and then passing it through a drier, wherein it is thoroughly desiccated, substantially as set forth.

In testimony whereof I affix my signature in presence of two witnesses.

ROBERT McKINNEY.

Witnesses:
  E. S. WHEELER,
  R. B. WHEELER.